United States Patent [19]

Serban et al.

[11] 3,859,440
[45] Jan. 7, 1975

[54] CERTAIN THIENYL COMPOUNDS USED TO CONTROL ACARINA

[75] Inventors: Alexander Serban, Doncaster; Lionel Grenville Webber, D'Aguilar, both of Australia

[73] Assignee: ICI Australia Limited, Melbourne, Victoria, Australia

[22] Filed: Sept. 26, 1972

[21] Appl. No.: 292,273

[30] Foreign Application Priority Data
Oct. 8, 1971   Australia............................. 6575/71

[52] U.S. Cl................. 424/275, 424/274, 424/285
[51] Int. Cl.............................................. A01n 9/12
[58] Field of Search... 424/275; 260/332.5, 329 AM

[56] References Cited
OTHER PUBLICATIONS
Journal of American Chem. Soc., 69, 2239–2241 (1947).
Chemical Abstracts 53:13132–13133 (1959).
Chemical Abstracts 51:15603f (1957).

*Primary Examiner*—Albert T. Meyers
*Assistant Examiner*—Leonard Schenkman
*Attorney, Agent, or Firm*—Cushman, Darby & Cushman

[57] ABSTRACT

Pesticidal compositions comprising at least one organic compound, present in biologically effective amount, of the general formula

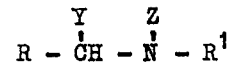

wherein R is selected from the group consisting of 2-furyl, 3-furyl, 2-pyrryl, 3-pyrryl, 2-thienyl, 3-thienyl, and halogen and lower alkyl substituted derivatives thereof; $R^1$ is selected from the group consisting of aromatic and alicyclic groups, optionally substituted with halogen or lower alkyl groups; Y and Z are either hydrogen or together form a covalent bond; and an inert carrier.

6 Claims, No Drawings

CERTAIN THIENYL COMPOUNDS USED TO CONTROL ACARINA

This invention relates to organic compounds having pesticidal activity, to compositions containing them, and to processes for controlling pests.

We have found that certain organic amine compounds exhibit useful pesticidal properties.

According to the present invention we provide pesticidally active compositions comprising at least one organic compound, present in pesticidally effective amount, of the general formula:

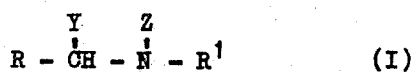

(I)

wherein R is selected from the group consisting of 2-furyl, 3-furyl, 2-pyrryl, 3-pyrryl, 2-thienyl, 3-thienyl, and halogen and lower alkyl substituted derivatives thereof; $R^1$ is selected from the group consisting of aromatic and alicyclic groups, optionally substituted with halogen or lower alkyl groups; Y and Z are either hydrogen or together form a covalent bond; and an inert carrier therefore.

Examples of typical compounds of general formula (I) are set out in Table I below.

TABLE I

| R | $R^1$ | Y, Z |
|---|---|---|
| 2-thienyl- | 4-chloro-phenyl | Y, Z, form covalent bond |
| 2-thienyl- | phenyl | Y, Z, form covalent bond |
| 2-furyl- | 4-chloro-phenyl | Y, Z, form covalent bond |
| 2-pyrryl- | phenyl | Y, Z, form covalent bond |
| 5-chloro-thienyl-2- | 4-chloro-phenyl | Y, Z, form covalent bond |
| 5-chloro-thienyl-2- | 4-methyl-phenyl | Y, Z, form covalent bond |
| 2-furyl- | 4-chloro-phenyl | Y, Z, are both hydrogen |
| 5-methyl-furyl-2- | 4-chloro-phenyl | Y, Z, are both hydrogen |
| N-methyl-pyrryl-2- | 4-chloro-phenyl | Y, Z, are both hydrogen |
| 5-chloro-thienyl-2- | 4-fluoro-phenyl | Y, Z, form covalent bond |
| 5-methyl-thienyl-2- | 4-fluoro-phenyl | Y, Z, form covalent bond |
| 5-methyl-thienyl-2- | 4-chloro-phenyl | Y, Z, form covalent bond |
| 3-thienyl- | 4-fluoro-phenyl | Y, Z, are both hydrogen |
| 3-thienyl- | 4-chloro-phenyl | Y, Z, are both hydrogen |
| 2-thienyl- | 4-fluoro-phenyl | Y, Z, form covalent bond |
| 5-methyl-thienyl-2- | 4-fluoro-phenyl | Y, Z, are both hydrogen |
| 5-methyl-thienyl-2- | 4-methyl-phenyl | Y, Z, form covalent bond |
| 2-thienyl- | 4-fluoro-phenyl | Y, Z, are both hydrogen |
| 2-furyl- | 4-fluoro-phenyl | Y, Z, form covalent bond |
| 3-methyl-thienyl-2- | 4-methyl-phenyl | Y, Z, form covalent bond |
| 3-methyl-thienyl-2- | 4-fluoro-phenyl | Y, Z, form covalent bond |
| 3-methyl-thienyl-2- | 4-chloro-phenyl | Y, Z, are both hydrogen |
| 3-methyl-thienyl-2- | 4-methyl-phenyl | Y, Z, are both hydrogen |
| 3-methyl-thienyl-2- | 4-fluoro-phenyl | Y, Z, are both hydrogen |
| 4-methyl-thienyl-2- | 4-chloro-phenyl | Y, Z, are both hydrogen |
| 2-chloro-thienyl-3- | 3,4-dichloro-phenyl | Y, Z, form covalent bond |
| 3-methyl-thienyl-2- | 3,4-dichloro-phenyl | Y, Z, form covalent bond |
| 2-thienyl- | 4-chloro-phenyl | Y, Z, are both hydrogen |
| 2-pyrryl- | 4-bromo-phenyl | Y, Z, form covalent bond |
| 5-chloro-thienyl-2- | 4-fluoro-phenyl | Y, Z, are both hydrogen |
| 3-bromo-thienyl-2- | phenyl | Y, Z, are both hydrogen |
| 3-thienyl- | phenyl | Y, Z, are both hydrogen |
| 3-bromo-thienyl-2- | 4-fluoro-phenyl | Y, Z, are both hydrogen |
| 3-thienyl- | 4-methyl-phenyl | Y, Z, are both hydrogen |
| 5-methyl-thienyl-2- | 3,4-dichloro-phenyl | Y, Z, form covalent bond |
| 2-thienyl- | 3,4-dichloro-phenyl | Y, Z, form covalent bond |
| 2-thienyl- | 3,4-dichloro-phenyl | Y, Z, are both hydrogen |
| 2-thienyl- | 2-methyl-4-chloro-phenyl | Y, Z, form covalent bond |
| 2-chloro-3-thienyl- | 4-chloro-phenyl | Y, Z, form covalent bond |
| 5-chloro-2-thienyl- | 4-chloro-phenyl | Y, Z, are both hydrogen |
| 5-methyl-2-thienyl- | 4-chloro-phenyl | Y, Z, are both hydrogen |
| 4-methyl-2-thienyl- | 4-methyl-phenyl | Y, Z, are both hydrogen |
| 4-methyl-2-thienyl- | 4-fluoro-phenyl | Y, Z, are both hydrogen |
| 3-bromo-2-thienyl- | 4-chloro-phenyl | Y, Z, are both hydrogen |
| 3-methyl-2-thienyl- | 3,4-dichloro-phenyl | Y, Z, are both hydrogen |
| 2-thienyl- | 2-methyl-4-chloro-phenyl | Y, Z, are both hydrogen |
| 5-methyl-2-thienyl- | 3,4-dichloro-phenyl | Y, Z, are both hydrogen |
| 2-chloro-3-thienyl- | 4-chloro-phenyl | Y, Z, are both hydrogen |
| 2-chloro-3-thienyl- | 3,4-dichloro-phenyl | Y, Z, are both hydrogen |
| 3-thienyl- | 3,4-dichloro-phenyl | Y, Z, are both hydrogen |
| 2-furyl- | 4-fluoro-phenyl | Y, Z, are both hydrogen |
| 2-pyrryl- | 4-chloro-phenyl | Y, Z, are both hydrogen |
| 2-thienyl- | cyclohexyl | Y, Z, are both hydrogen |
| 5-methyl-2-thienyl- | cyclohexyl | Y, Z, are both hydrogen |
| 5-chloro-2-thienyl- | cyclohexyl | Y, Z, are both hydrogen |

Preferred pesticidally active compositions according to the present invention are those comprising organic compounds of the general formula (I) hereinabove wherein $R^1$ is selected from the group consisting of phenyl, and halogen and lower alkyl substituted derivatives thereof. More preferred pesticidally active compositions are those comprising organic compounds of the general formula (I) wherein R is selected from the group consisting of 2-thienyl and 3-thienyl and halogen and lower alkyl substituted derivatives thereof, $R^1$ is selected from the group consisting of phenyl and halogen and lower alkyl substituted derivatives thereof, and Y and Z are hydrogen, or together form a covalent bond.

The compounds and compositions of this invention have useful pesticidal properties; thus the compounds of the formula:

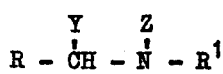

wherein R, R¹, Y and Z are as defined hereinabove, have shown high contact and residual activity against various species of insects, mites and ticks, e.g. *Musca domestica* (house fly), *Lucilia cuprina* (sheep blow fly), *Plutella maculipennis* (cabbage moth), *Cydia pomonella* (codling moth), *Tortrix postvittana* (light brown apple moth), *Tetranychus telarius* (red spider), *Calandra granaria* (grain weevil), *Psudoccus maritimus* (mealy bug), *Aphis craccivora* (cowpea aphid), *Thorimaea operculella* (potato moth), *Aonidiella aurantii* (red scale), *Tribolium confusium* (confused flower beetle) and *Boophilus microplus* (cattle tick).

It is to be understood that the pesticidally active compositions of this invention may comprise, in addition to the compounds of the general formula (I) described hereinabove, and an inert carrier, one or more other compounds having pesticidal activity. By inert carrier we mean any liquid or solid diluent used to obtain the desired concentration of the compound of formula (I) and to facilitate handling and which does not have undesirable biological properties, for example phytotoxicity, and which does not react with the compound of formula (I).

The compounds and compositions of the invention may be used for animal husbandry, agricultural or horticultural purposes and the particular inert carrier used in any instance will depend upon the particular purpose for which it is to be used. For most purposes liquid formulations to be used as sprays are most convenient and amongst these again aqueous liquid formulations are preferred. These sprays are generally aqueous solutions, dispersions, or emulsions, and may be prepared by dissolving the active ingredient or ingredients of general formula (I) in a liquid inert carrier; suitable liquid inert carriers are solvents, which are non-toxic to the media to which the formulation is to be applied. The compositions of our invention may comprise one or more wetting, dispersing, or emulsifying agents. Such compositions are normally diluted with water which may likewise contain one or more wetting, dispersing, or emulsifying agents. Suitable organic solvents are for example toluene, kerosene, methylated naphthalenes, xylenes, trichloroethylene, ethylene dichloride, isopropyl alcohol, diacetone alcohol and propylene glycol.

The compositions to be used as sprays may also be in the form of aerosols wherein the formulation is held in a container under pressure in the presence of a propellant such as dichlorodifluoromethane or fluorotrichloromethane.

Alternatively our compositions may also be formulated in the form of dusting powders or granules wherein the active ingredient is mixed with a solid inert carrier. Suitable solid inert carriers may be, for example, kaolin, powdered chalk, talcs, kieselguhr, dolomite, calcium carbonate, powdered magnesia, Fuller's earth, gypsum, Hewitt's earth, diatomaceous earth, china clay, bentonite, and other colloidal clays.

The compositions may also be in the form of dispersible powder or grains comprising, in addition to the active ingredient an inert carrier comprising a wetting agent to facilitate the dispersion of the powder or grains in liquids. Such powders or grains may include fillers, suspending agents and the like. The preferred dispersible powders comprise the active ingredient mixed with a finely ground colloidal clay together with a dispersing agent.

Suitable wetting agents, dispersing agents and emulsifying agents are known from the prior art and may be of the cationic, anionic or non-ionic type. Suitable agents of the cationic type include for example quaternary ammonium compounds such as cetyltrimethylammonium bromide. Suitable agents of the anionic type include for example soaps, salts of aliphatic monoesters of sulphuric acid, for example sodium lauryl sulphate, salts of sulphonated aromatic compounds, for example sodium dodecyl-benzene sulphonate, sodium, calcium, or ammonium lignosulphonate, butylnahthalene sulphonate and a mixture of the sodium salts of di-isopropyl and tri-isopropylnaphthalene sulphonic acids. Suitable agents of the non-ionic type include for example the condensation products of an alkylene oxide such as ethylene oxide or propylene oxide with fatty alcohols such as oleyl alcohol or cetyl alcohol, or with alkylphenols such as octyl-phenyl, nonyl-phenol and octyl-cresol. Other non-ionic agents are the partial esters derived from long chain fatty acids and hexitol anhydrides, the condensation products of the said partial esters with an alkylene oxide such as ethylene oxide or propylene oxide and the lecithins.

Suitable suspending agents are for example, hydrophilic colloids, for example polyvinyl pyrrolidone and sodium carboxymethyl cellulose, and the vegetable gums, for example gum acacia and gum tragacanth.

By the inclusion of suitable additives, for example for improving the distribution, adhesive power, and resistance to rain on treated surfaces, the different compositions can be better adapted for the various uses for which they are intended.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods, and after such storage, to be capable of dilution with water so as to form aqueous preparations which remain homogeneous for a sufficient time to enable them to be applied by conventional spray equipment. Suitable formulations will depend on the nature of the active ingredient or ingredients and those most suited for any particular purpose may be determmined by those persons skilled in the art by a few simple experiments. The concentrates may conveniently contain from 10 to 85 percent by weight of the active ingredient or ingredients and generally from 25 to 60 percent by weight of the active ingredient or ingredients. When diluted to form aqueous preparations, such preparations may contain varying amounts of the active ingredient or ingredients, depending upon the purpose for which they are to be used, but an aqueous preparation containing between 0.0001 percent and 10 percent by weight, preferably between 0.01 and 1.0 percent by weight may be used. A typical emulsifiable concentrate of this type would comprise 20 percent 2-thenylidene-4-chloro-aniline, 40 percent kerosene, 35 percent xylene and 5 percent of an alkyl aryl polyether alcohol emulsifier, all quantities being expressed on a weight basis.

As already stated above the compounds of our invention have useful pesticidal properties. Thus we have discovered that our compounds kill the eggs and mobile stages of *Tetranychus telarius* (red spider) and *Tetranychus urticae* (two spotted mite) for example on beans, and are also effective in controlling infestations on animals of *Boophilus microplus* (cattle tick) of both the so-called susceptible and resistant strains.

Accordingly we provide a process of eradicating undesired acarina, which process comprises treating media including plants and animals infested with acarina with the compositions according to this invention.

We have also discovered that the compounds of this invention are effective in eradicating insects, for example *Calandra granaria* (grain weevil), *Musca domestica* (house fly), *Lucilia cuprina* (sheep blowfly), *Plutella maculipennis* (cabbage moth), *Cydia pomonella* (codling moth), *Tortrix postvittana* (light brown apple moth), Psudoccus maritimus (mealy bug) and *Aphis craccivora* (cowpea aphid) at varying stages of their development.

Accordingly we provide a process of eradicating undesired insects which process comprises treating media infested with insects with compositions according to this invention. Infested media may be grain, plants or domestic animals. Our compounds are useful in eradicating or controlling strains of insects which have become resistant to treatment with commonly used insecticides.

We have also discovered that the compounds of this invention are effective in eradicating or controlling undesired fungi, for example, *Venturia inaquelis* (black spot), *Ustilago hordei* (covered smut), *Tilletia foetida* (stinking bunt of wheat), *Peronospora tabacina* (blue mould of tobacco), *Erysiphe graminis* (wheat powdery mildew), *Alternaria solani* (early blight of tomatoes), *Puccinia coronate* (oat rust), and *Sclerotinia fructicola* (brown rot).

Accordingly we provide a process of eradicating undesired fungi which process comprises treating media infested with fungi with compositions according to this invention.

Certain of the compounds of general formula (I) described hereinabove are novel.

Accordingly we provide new compounds of the general formula:

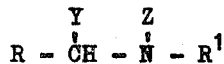

wherein R is selected from the group consisting of 2-thienyl, 3-thienyl, 2-pyrryl, 3-pyrryl, 2-furyl, 3-furyl or halogen or lower alkyl substituted derivatives of these, and $R^1$ is an aromatic or alicyclic group, or a halogen or lower alkyl substituted derivative thereof, and Y and Z are hydrogen, or together form a covalent bond; when Y and Z are hydrogen and R is 2-thienyl then $R^1$ may not be phenyl, 4-chlorophenyl or 4-methyl-phenyl, and when Y and Z are hydrogen and R is 5-bromo-thienyl-2-, 5-chloro-thienyl-2, or 5-methyl-thienyl-2, then $R^1$ may not be phenyl; if Y and Z are hydrogen and R is 2-furyl, then $R^1$ may not be phenyl or 4-methyl-phenyl and if Y and Z are hydrogen and R is 5-bromo-furyl-2- then $R^1$ may not be phenyl; when Y and Z together form a covalent bond and R is 2-thienyl, then $R^1$ may not be phenyl, 4-methyl-phenyl, or 4-chloro-phenyl and when Y and Z together form a covalent bond and R is 5-methyl-thienyl-2-, 3-methylthienyl-2-, or 3-thienyl the $R^1$ may not be phenyl; when Y and Z together form a covalent bond, R may not be 2-furyl, 3-furyl, 2-pyrryl or 3-pyrryl.

The novel compounds of our invention as disclosed hereinabove can be prepared by methods known in the art for analogous compounds. Thus compounds of the general formula (I) wherein Y and Z form a covalent bond are conveniently made according to the reaction:

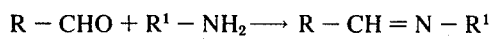

II.

wherein R and $R^1$ are as hereinabove defined.

Compounds of general formula (I) wherein Y and Z are both hydrogen are conveniently prepared by reduction of the Schiff bases (II) with sodium borohydride according to the equation:

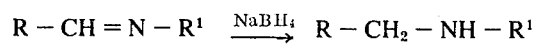

III

Alternatively the aniline compounds (III) may be made directly, by the reaction of the appropriately substituted methyl chloride and the appropriately substituted aniline in the presence of a base according to the equation:

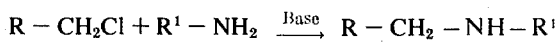

IV

The following examples illustrate the preparation of the compounds and compositions of our invention and their biological effects, but are not to be construed as limiting.

Example 1

This example illustrates the preparation of 2-thenylidene-3,4-dichloro-aniline having the formula:

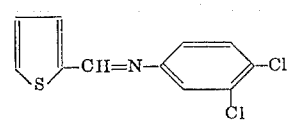

Thiophene-2-aldehyde (5.6 g., 0.05 mole) and 3,4-dichloro-aniline (8.1 g., 0.05 mole) were added to warm ethanol (50 ml), and the reaction mixture was stirred and allowed to stand overnight in an ice-bath. The following day the product was filtered off, washed with cold methanol, and dried, to yield 10.2 g of product of melting point 80.5° – 81°C.

Examples 2 to 23 inclusive

Compounds of the formula:

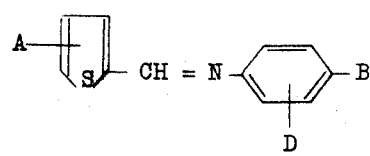

were prepared by the procedure of Example 1, except that the thiophene-2-aldehyde was replaced with 0.05 mole of the appropriate substituted thiophene-2-aldehyde and the 3,4-dichloro-aniline was replaced by 0.05 mole of the appropriate substituted aniline to yield compounds of the above formula, and wherein the substituents A, B and D are listed in Table II below.

TABLE II

| Example No. | A | B | D | Melting point or boiling point of product (°C) |
|---|---|---|---|---|
| 2 | 5—Cl | —Cl | —H | 84° |
| 3 | 5—Cl | —F | —H | 71–3° |
| 4 | 5—Cl | —CH₃ | —H | 72° |
| 5 | 5—CH₃ | —Cl | —H | 103–4° |
| 6 | 5—CH₃ | —F | —H | 79–83° |
| 7 | 5—CH₃ | —CH₃ | —H | 87° |
| 8 | —H | —F | —H | 48° |
| 9 | 3—CH₃ | —Cl | —H | 69–72° |
| 10 | 3—CH₃ | —CH₃ | —H9 | 56–8° |
| 11 | 3—CH₃ | —F | —H | 77° |
| 12 | 4—CH₃ | —Cl | —H | 80–1° |
| 13 | 4—CH₃ | —CH₃ | —H | 51–2° |
| 14 | 4—CH₃ | —F | —H | 42–3° |
| 15 | 3—Br | —Cl | —H | 113° |
| 16 | 3—CH₃ | —Cl | 3—Cl | b.p. 240–50°/20 mm |
| 17 | —H | —Cl | 2—CH₃ | 67° |
| 18 | 3—Br | —H | —H | b.p. 144–5°/0.5 mm |
| 19 | 3—Br | —F | —H | 92–3° |
| 20 | 5—CH₃ | —Cl | 3—Cl | 79° |
| 21 | —H | —Cl | —H | 71° |
| 22 | —H | —Br | —H | 89° |
| 23 | —H | —I | 3—I | 108–110° |

Examples 24 - 29 inclusive
Compounds of the formula:

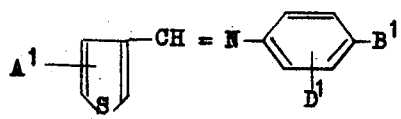

were prepared by the procedure of Example 1, except that the thiophene-2-aldehyde was replaced with 0.05 mole of the appropriate substituted thiophene-3-aldehyde and the 3,4-dichloro-aniline was replaced by 0.05 mole of the appropriate substituted aniline to yield compounds of the above formula and wherein the substituents $A^1$, $B^1$ and $D^1$ are listed in Table III below.

TABLE III

| Example No. | $A^1$ | $B^1$ | $D^1$ | Melting point of product (°C) |
|---|---|---|---|---|
| 24 | —H | —F | —H | 46–8° |
| 25 | —H | —Cl | —H | 58–9° |
| 26 | 2—Cl | —Cl | —H | 89–90° |
| 27 | 2—Cl | —Cl | 3—Cl | 52–3° |
| 28 | —H | —Cl | 3—Cl | 61–2° |
| 29 | —H | —CH₃ | —H | 60–1° |

Examples 30 to 32 inclusive
Compounds of the formula:

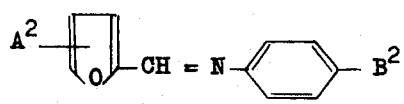

were prepared by the procedure of Example 1, except that the thiophene-2-aldehyde was replaced with 0.05 mole of the appropriate substituted 2-furfuraldehyde and the 3,4-dichloro-aniline was replaced by 0.05 mole of the appropriate substituted aniline to yield compounds of the above formula, and wherein the substituents $A^2$ and $B^2$ are listed in Table IV below.

TABLE IV

| Example No. | $A^2$ | $B^2$ | Melting point of product (°C) |
|---|---|---|---|
| 30 | —H | —F | b.p. 162–165°/25 mm |
| 31 | —H | —Cl | 48–50° |
| 32 | 5—CH₃ | —Cl | 58° |

Examples 33 to 35 inclusive
Compounds of the formula:

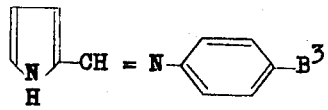

were prepared by the procedure of Example 1 except that the thiophene-2-aldehyde was replaced with 0.05 mole of pyrrole-2-aldehyde and the 3,4-dichloro-aniline was replaced by 0.05 mole of the appropriate substituted aniline to yield compounds of the above formula, and wherein the substituents $B^3$ are listed in Table V below.

TABLE V

| Example No. | $B^3$ | Melting point of product (°C) |
|---|---|---|
| 33 | —H | 93° |
| 34 | —Cl | 97–98° |
| 35 | —Br | 101° |

Example 36
This example illustrates the preparation of N-(5-methyl-2-thenyl)-4-methyl-aniline having the formula:

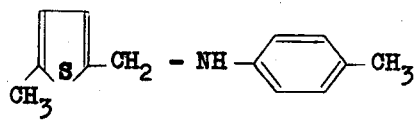

(5-methyl-2-thenylidene)-4-methyl-aniline (10.75 g. 0.05 M) prepared by the method of Example 7 hereinabove, was dissolved in hot methanol (100 ml.) on a water bath, and sodium borohydride (3.8 g.) was added in small portions with stirring. The reaction mixture was allowed to stand overnight, and next day was refluxed on a water bath, and a further quantity (1.9 g.) of sodium borohydride was added in small portions over a two hour period without stirring, and refluxing was then continued for a further 8 hours. The following day 12 g. of sodium hydroxide was dissolved in a small quantity of water, and this solution was added with stirring to the reaction mixture, which was then diluted with water and cooled in an ice-bath. On standing the aniline compound precipitated, and it was then filtered off, washed with water, and recrystallized from ethanol to yield 6.3 g. of N-(5-methyl-2-thenyl)-4-methyl-aniline of melting point 30°–2°C.

Examples 37 to 56 inclusive
Compounds of the formula:

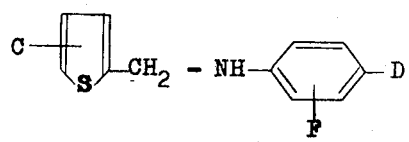

were prepared by the procedure of Example 36, except that the (5-methyl-2-thenylidene)-4-methyl-aniline was replaced with 0.05 mole of the appropriate substituted 2-thenylidene aniline to yield compounds of the above formula, and wherein the substituents C, D and F are listed in Tables VI A and VI B below. The compounds were purified by recrystallization, distillation, or chromatography.

TABLE VI A

| Example No. | C | D | F | Melting point of product (°C.) |
|---|---|---|---|---|
| 37 | —H | —Cl | —H | 43–45° |
| 38 | —H | —F | —H | b.p. 148/08 mm |
| 39 | 5—Cl | —F | —H | 24° |
| 40 | 5—Cl | —Cl | —H | 49–50° |
| 41 | 5—Cl | —CH₃ | —H | 66–7° |
| 42 | 5—CH₃ | —Cl | —H | 32–3° |
| 43 | 5—CH₃ | —F | —H | 38–40° |
| 44 | 3—CH₃ | —Cl | —H | b.p. 168–70°/0.5 mm |
| 45 | 3—CH₃ | —CH₃ | —H | b.p. 143–5°/0.4 mm |
| 46 | 3—CH₃ | —F | —H | b.p. 195–200°/24 mm |
| 47 | 4—CH₃ | —Cl | —H | 67° |
| 48 | 4—CH₃ | —CH₃ | —H | b.p. 199–200°/14 mm |
| 49 | 4—CH₃ | —F | —H | 60–1° |
| 50 | 3—Br | —Cl | —H | 49° |
| 51 | 3—CH₃ | —Cl | 3—Cl | b.p. 242–5°/15 mm |

\* TABLE VI B

| Example No. | C | D | F | Methyl | Methylene | Amino | Aromatic |
|---|---|---|---|---|---|---|---|
| 52 | —H | —Cl | 2—CH₃ | 2 | 4.38 | 3.7 | 6.3–7.2 |
| 53 | 3—Br | —H | —H | — | 4.40 | 3.85 | 6.4–7.35 |
| 54 | 3—Br | —F | —H | — | 4.35 | 3.8 | 6.3–7.15 |
| 55 | 5—CH₃ | —Cl | 3—Cl | 2.38 | 4.26 | 3.85 | 6.25–7.2 |
| 56 | —H | —Cl | 3—Cl | — | 4.35 | 4 | 6.25–7.15 |

N.M.R. Spectral Data — position of peaks (ppm) indicating presence of the following classes of hydrogen atoms —

*These compounds were purified by column chromatography, and boiling point determinations were not carried out.

Examples 57 to 63 inclusive
Compounds of the formula:

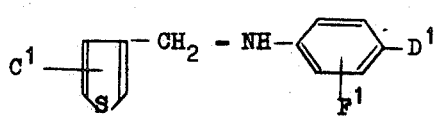

were prepared by the procedure of Example 36, except that the (5-methyl-2-thenylidene)-4-methyl-aniline was replaced with 0.05 mole of the appropriate substituted 3-thenylidene aniline to yield compounds of the above formula, and wherein the substituents $C^1$, $D^1$ and $F^1$ are listed in Tables VII A and VII B below. The compounds were purified by distillation or chromatography.

TABLE VII A

| Example No. | $C^1$ | $D^1$ | $F^1$ | Boiling point of product (°C.) |
|---|---|---|---|---|
| 57 | 2—Cl | —Cl | —H | b.p. 223–5°/15 mm |
| 58 | 2—Cl | —Cl | 3—Cl | b.p. 253–5°/20 mm |
| 59 | —H | —H | —H | b.p. 206–7°/25 mm |
| 60 | —H | —Cl | 3—Cl | b.p. 176–7°/0.2 mm |
| 61 | —H | —CH₃ | —H | b.p. 159–60°/1 mm |

\* TABLE VII B

| Example No. | $C^1$ | $D^1$ | $F^1$ | Methylene | Amino | Aromatic |
|---|---|---|---|---|---|---|
| 62 | —H | —F | —H | 4.15 | 3.6 | 6.2–7.2 |
| 63 | —H | —Cl | —H | 4.1 | 3.7 | 6.2–7.3 |

N.M.R. Spectral Data — position of peaks (ppm) indicating presence of the following classes of hydrogen atoms —

*These compounds were purified by column chromatography and boiling point determinations were not carried out.

Examples 64 to 66 inclusive
Compounds of the formula:

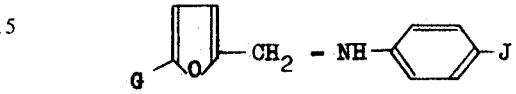

were prepared by the procedure of Example 36, except that the (5-methyl-2-thenylidene)-4-methyl-aniline was replaced with 0.05 mole of the appropriate substituted 2-furfurylidene aniline to yield compounds of the above formula, and wherein the substituents G and J are listed in Table VIII below. The compounds were purified by recrystallization or distillation.

TABLE VIII

| Example No. | G | J | Melting or boiling point of product (°C.) |
|---|---|---|---|
| 64 | —H | —Cl | 26–7° |
| 65 | —H | —F | b.p. 160–4°/25 mm |
| 66 | —CH₃ | —Cl | 34° |

Examples 67 and 68
Compounds of the formula:

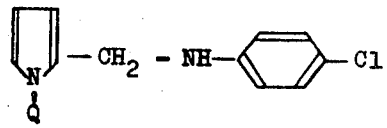

were prepared by the procedure of Example 36, except that the (5-methyl-2-thenylidene)-4-methyl-aniline was replaced with 0.05 mole of the appropriate 2-pyrryl-methylideneanilines to yield compounds of the above formula, and wherein the substituents Q are listed in Table IX below.

TABLE IX

| Example No. | Q | Melting point of product (°C.) |
|---|---|---|
| 67 | —H | 94–4° |
| 68 | —CH₃ | 39° |

Examples 69 and 70
Compounds of the formula:

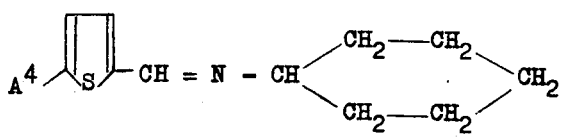

were prepared by the procedure of Example 1, except that where necessary the thiophene-2-aldehyde was replaced with 0.05 mole of the appropriate substituted thiophene-2-aldehyde and the 3,4-dichloro-aniline was replaced by 0.05 mole of cyclohexylamine to yield compounds of the above formula, and wherein the substituents $A^4$ are listed in Table X below.

TABLE X

| Example No. | $A^4$ | Boiling point of product (°C). |
|---|---|---|
| 69 | H | 168–70°/25 mm |
| 70 | —CH₃ | 180–4°/25 mm |

Examples 71 to 73 inclusive
Compounds of the formula:

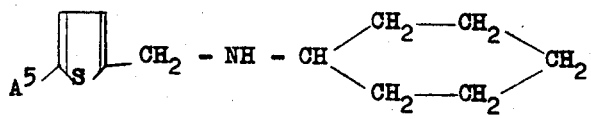

were prepared by the procedure of Example 36, except that the (5-methyl-2-thenylidene)-4-methyl-aniline was replaced with 0.05 mole of the appropriate substituted 2-thenylidene cyclohexylamine to yield compounds of the above formula, and wherein the substituents $A^5$ are listed in Tables XI A and XI B below. The compounds were purified by distillation, or chromatography.

TABLE XI A

| | | N.M.R. Spectral Data — position of peaks (ppm) indicating presence of the following classes of hydrogen atoms — | | | |
|---|---|---|---|---|---|
| Example No. | $A^5$ | Methyl | Methylene | Cyclohexyl and amino | Thiophene |
| 71 | —H | — | 3.9 | 1.0 – 2.8 | 6.8 – 7.2 |
| 72 | —CH₃ | 2.4 | 3.9 | 1.0 – 2.8 | 6.8 – 7.2 |

TABLE XI B

| Example No. | $A^5$ | Boiling point of product (°C). |
|---|---|---|
| 73 | —Cl | 182 – 3°/5 mm |

Example 74

Formulations of the compounds of the invention were prepared to give a 50 percent w/v concentration of active ingredient and these were diluted with water to give concentrations of the active ingredient suitable for demonstrating pesticidal activity. The concentrated formulations were prepared as follows. The compounds of the invention listed below were dissolved, by warming if necessary, in toluene to give a 50 percent w/v concentration of active ingredient. A mixture of equal volumes of "Lubrol" E (a condensation product of alkyl-phenol with ethylene oxide) and "Lubrol" MOA (a long chain fatty alcohol/ethylene oxide condensate with a relatively short ethylene glycol chain) was added to the mixture. "Lubrol" E and "Lubrol" MOA are both registered Trade Marks. The concentration of the combined weights of "Lubrol" E and "Lubrol" MOA in the concentrated solution was 5 percent w/v. The concentrated solution was then emulsified in water and further diluted with water to give aqueous sprayable compositions containing 0.05 and 0.1 percent w/v of active material.

The compounds used in this example and the following examples are designated numerically in Table XII below.

TABLE XII

| No. | Compound |
|---|---|
| 1 | 2-thenylidene-4-chloro-aniline |
| 2 | 2-pyrryl-methylidene-aniline |
| 3 | 5-chloro-2-thenylidene-4-chloro-aniline |
| 4 | 5-chloro-2-thenylidene-4-methyl-aniline |
| 5 | N-(2-furfuryl)-4-chloro-aniline |
| 6 | 5-methyl-2-thenylidene-4-fluoro-aniline |
| 7 | 5-methyl-2-thenylidene-4-chloro-aniline |
| 8 | N-(3-thenyl)-4-fluoro-aniline |
| 9 | N-(3-thenyl)-4-chloro-aniline |
| 10 | N-(5-methyl-2-thenyl)-4-fluoro-aniline |
| 11 | 5-methyl-2-thenylidene-4-methyl-aniline |
| 12 | N-(2-thenyl)-4-fluoro-aniline |
| 13 | 3-methyl-2-thenylidene-4-fluoro-aniline |
| 14 | N-(3-methyl-2-thenyl)-4-chloro-aniline |
| 15 | N-(3-methyl-2-thenyl)-4-fluoro-aniline |
| 16 | N-(4-methyl-2-thenyl)-4-chloro-aniline |
| 17 | 2-chloro-3-thenylidene-3,4-dichloro-aniline |
| 18 | 3-methyl-2-thenylidene-3,4-dichloro-aniline |
| 19 | N-(3-bromo-2-thenyl)-4-fluoro-aniline |
| 20 | N-(3-thenyl)-4-methyl-aniline |
| 21 | N-(2-thenyl)-4-chloro-aniline |
| 22 | 2-thenylidene-aniline |
| 23 | 2-thenylidene-4-bromo-aniline |
| 24 | 2-thenylidene-3,4-diiodo-aniline |
| 25 | 2-furfurylidene-4-fluoro-aniline |
| 26 | 5-methyl-2-furfurylidene-4-chloro-aniline |
| 27 | 2-furfurylidene-4-chloro-aniline |
| 28 | 2-pyrryl-methylidene-4-chloro-aniline |
| 29 | 2-pyrryl-methylidene-4-bromo-aniline |
| 30 | N-(4-methyl-2-thenyl)-4-fluoro-aniline |
| 31 | N-(3-bromo-2-thenyl)-4-chloro-aniline |
| 32 | N-(2-chloro-3-thenyl)-4-chloro-aniline |
| 33 | N-(2-chloro-3-thenyl)-3,4-dichloro-aniline |
| 34 | 3-methyl-2-thenylidene-4-chloro-aniline |
| 35 | 3-methyl-2-thenylidene-4-methyl-aniline |
| 36 | 2-thenylidene-3,4-dichloro-aniline |
| 37 | 2-chloro-3-thenylidene-4-chloro-aniline |
| 38 | N-(5-chloro-2-thenyl)-4-chloro-aniline |
| 39 | N-(2-furfuryl)-4-fluoro-aniline |
| 40 | N-(5-methyl-2-furfuryl)-4-chloro-aniline |
| 41 | N-[(N'-methyl-2-pyrryl)methyl]-4-chloro-aniline |
| 42 | N-(2-pyrryl-methyl)-4-chloro-aniline |
| 43 | N-(3-methyl-2-thenyl)-3,4-dichloro-aniline |
| 44 | N-(2-thenyl)-2-methyl-4-chloro-aniline |
| 45 | N-(3-bromo-2-thenyl)-aniline |
| 46 | N-(5-methyl-2-thenyl)-3,4-dichloro-aniline |
| 47 | N-(2-thenyl)-3,4-dichloro-aniline |
| 48 | N-(3-thenyl)-aniline |
| 49 | 2-thenylidene-4-fluoro-aniline |
| 50 | 2-thenylidene-2-methyl-4-chloro-aniline |
| 51 | 5-methyl-2-thenylidene-3,4-dichloro-aniline |
| 52 | N-(5-chloro-2-thenyl)-4-fluoro-aniline |
| 53 | N-(3-thenyl)-3,4-dichloro-aniline |
| 54 | N-(4-methyl-2-thenyl)-4-methyl-aniline |
| 55 | N-(2-thenyl)-cyclohexylamine |
| 56 | N-(5-methyl-2-thenyl)-cyclohexylamine |
| 57 | N-(5-chloro-2-thenyl)-cyclohexylamine |
| 58 | 5-chloro-2-thenylidene-4-fluoro-aniline |
| 59 | 3-thenylidene-4-fluoro-aniline |
| 60 | N-(3-methyl-2-thenyl)-4-methyl-aniline |

Example 75

To demonstrate the pesticidal effect of compounds 2, 4, 6, 9, 10, 11, 13, 14, 16, 18, 19 and 23 on ova of *Tetranychus urticae* (two spotted mite), sprays were prepared as in Example 74 and containing 0.05 and 0.1 percent w/v of active ingredient. French bean plants with leaves cut to 1 inch square were infested with approximately 30 ova of *Tetranychus urticae* each. 2 days after infestation any adult mites which had developed were blown off the leaves by means of a jet of air. The infested leaves of two plants per treatment were sprayed to drip point with formulations as set out in Table XIII and 6 days after spraying the number of ova which had hatched was determined. The control of ova obtained by these tests is given in Table XIII as percentage mortality.

TABLE XIII

| Active Ingredient Compound | % Mortality at % w/v concentration of active ingredient | | |
|---|---|---|---|
| | Nil | 0.05 | 0.1 |
| 2 | 0 | — | 30 |
| 4 | 0 | — | 52 |
| 6 | 0 | — | 88 |
| 9 | 0 | 78 | 100 |
| 10 | 0 | 47 | 100 |
| 11 | 0 | — | 60 |
| 13 | 0 | — | 80 |
| 14 | 0 | 53 | 100 |
| 16 | 0 | 57 | 85 |
| 18 | 0 | — | 55 |
| 19 | 0 | — | 100 |
| 23 | 0 | 49 | 54 |
| 40 | 0 | 52 | 67 |

The column designated "Nil" means that the control spray applied contained no active ingredient and the control mortality given in this column is the highest mortality obtained in the "control" during parallel testing of the respective compounds. Where the table shows a dash – this indicates that no tests were done at the designated concentration of active ingredient.

Example 76

To demonstrate the pesticidal effect of compounds 9, 10, 14 and 16 on adult *Tetranychus urticae*, sprays were prepared as in Example 74 and containing 0.05 and 0.1 percent w/v of active ingredient. French bean plants with leaves cut to 1 inch square were infested with approximately 30 adult mites of *Tetranychus urticae* (two spotted mite) each. 24 hours after infestation the leaves of two plants per treatment were sprayed to drip point with formulations as set out in Table XIV and 4 days after spraying, the live and dead adult mites were counted. The control of mites obtained by these tests is given in Table XII as percentage mortality.

TABLE XIV

| Active Ingredient Compound | % Mortality at % w/v concentration of active ingredient | | |
|---|---|---|---|
| | Nil | 0.05 | 0.1 |
| 9 | 0 | 24 | 75 |
| 10 | 0 | 86 | 100 |
| 14 | 0 | 34 | 78 |
| 16 | 0 | 97 | 100 |

The column designated "Nil" is as defined above.

Example 77

To demonstrate the pesticidal effect of compound 17 on larvae of *Lucilia cuprina* (sheep blowfly), emulsions of this compound were prepared as in Example 74 and these were diluted with water and mixed with molten agar to give a weight per volume concentration of active ingredient compound of 25 p.p.m. in the final product. The prepared agar mixtures were poured onto glass surfaces ad allowed to solidify. Newly hatched larvae of *Lucilia cuprina* were dropped on the prepared agar and assessed for viability 24 hours after treatment. Three such tests showed an average kill of larvae, all three results lying in the 90 – 100 percent kill range.

Example 78

So as to demonstrate the pesticidal effect of certain of our compounds 1, 3, 8, 10, 12, 14 and 21 on *Boophilus microplus* (cattle tick), of a susceptible "Yeerongpilly" strain, formulations were prepared as in Example 74 and containing 1.0 percent w/v of active ingredient. The emulsions so obtained were sprayed on to 2 year old calves weighing approximately 300 lb., at the rate of 1 gallon per calf. The calves were heavily infested with various stages of the susceptible "Yeerongpilly" strain of cattle tick. The effect of the active ingredient on the ticks was assessed in various ways.

i. All adult female ticks which were fully engorged at the time of spraying were collected as they dropped off calves kept in isolation for a period of 24 hours. They were then placed in a Petri dish in an incubator for an assessment of mortality based upon capacity to lay eggs as shown by hatch of viable larvae. This result is shown in Table XIII as "mortality of engorged adults."

ii. At daily intervals pre-determined sampling areas on each calf were inspected for the effect of the chemical on the other stages present at the time of spraying. As a result, a final assessment was obtained of the percentage kill of these stages as follows:

| Estimated percentage kill | 0 | 1–24 | 25–49 | 50–74 | 75–94 | 95–99 | 100 |
|---|---|---|---|---|---|---|---|
| Mortality rating | 0 | 1 | 2 | 3 | 4 | 5 | 6 |

These assessments are shown in Table XIII as "mortality of nymphs" and "mortality of unengorged adults" respectively.

The results listed in Table XV show that our process for controlling "susceptible" strains of cattle tick, as typified by the "Yeerongpilly" strain is highly effective.

TABLE XV

| Active Ingredient Compound | Percentage Active Ingredient in spray (w/v) | Strain | Mortality of engorged adults % | Mortality of unengorged adults (rating) | Mortality of nymphs (rating) |
|---|---|---|---|---|---|
| 1 | 1.0 | Yeerongpilly | 100 | 3 | 3 |
| 3 | 1.0 | Yeerongpilly | 80 | 5 | 6 |

Table XV—Continued

| Active Ingredient Compound | Percentage Active Ingredient in spray (w/v) | Strain | Mortality of engorged adults % | Mortality of unengorged adults (rating) | Mortality of nymphs (rating) |
|---|---|---|---|---|---|
| 8 | 1.0 | Yeerongpilly | 100 | 5 | 2 |
| 10 | 1.0 | Yeerongpilly | 90 | 5 | 4 |
| 12 | 1.0 | Yeerongpilly | 70 | 5 | 3 |
| 14 | 1.0 | Yeerongpilly | 55 | 5 | 4 |
| 21 | 1.0 | Yeerongpilly | 100 | 5 | 6 |

Example 79

The procedure of Example 78 was repeated using compounds 6, 7, 14, 15, 20 and 23, but the susceptible "Yeerongpilly" strain was replaced by the resistant "Biarra" strain. The results obtained are listed in Table XVI.

TABLE XVI

| Active Ingredient Compound | Percentage Active Ingredient in spray (w/v) | Strain | Mortality of engorged adults % | Mortality of unengorged adults (rating) | Mortality of nymphs (rating) |
|---|---|---|---|---|---|
| 6 | 1.0 | Biarra | 50 | 0 | 0 |
| 7 | 1.0 | Biarra | 100 | 3 | 0 |
| 14 | 1.0 | Biarra | 55 | 5 | 4 |
| 15 | 1.0 | Biarra | 90 | 3 | 5 |
| 20 | 1.0 | Biarra | 80 | 5 | 4 |
| 23 | 1.0 | Biarra | 100 | 2 | — |

Example 80

The pesticidal effect of certain of our compounds on adult female and larval cattle ticks was tested as follows:

Using the procedure set out in Example 74, aqueous compositions were prepared containing active ingredient at concentrations set out in Tables XVII and XVIII. Twenty engorged adult female cattle ticks were treated individually by the micro-syringe technique.

One microdrop (freely falling) from a micro-syringe having a carefully cleaned needle of 0.15 mm internal bore and 0.4 mm external diameter was dropped on to the neutral portion of each tick to be treated. After 14 days the mortality count of the adult ticks was assessed by counting the number of eggs laid by them and the percentage hatching of these eggs.

In addition approximately 100 larval ticks were immersed briefly in preparations similar to those described above and a mortality count on the larval ticks was done after 48 hours. The control attained is given in Tables XVII and XVIII as percentage mortality.

TABLE XVII

Adult cattle tick — Mortality after 14 days

| Active Ingredient Compound | Concentration of Active Ingredient (% w/v) | % Mortality |
|---|---|---|
| 3 | 1.0 | 100 |
|   | 0.1 | 25 |
| 5 | 1.0 | 100 |
|   | 0.1 | 5 |
| 6 | 1.0 | 35 |
|   | 0.1 | 0 |
| 9 | 1.0 | 100 |
|   | 0.1 | 0 |
| 10 | 1.0 | 85 |
|   | 0.1 | 0 |
| 12 | 1.0 | 70 |
|   | 0.1 | 0 |
| 14 | 1.0 | 100 |
|   | 0.1 | 95 |
| 27 | 1.0 | 100 |
|   | 0.1 | 25 |
| 28 | 1.0 | 100 |
|   | 0.1 | 65 |
| 29 | 1.0 | 90 |
|   | 0.1 | 5 |
| 30 | 1.0 | 100 |
|   | 0.1 | 0 |
| 31 | 1.0 | 100 |
|   | 0.1 | 5 |
| 32 | 1.0 | 100 |
|   | 0.1 | 40 |
| 33 | 1.0 | 60 |
|   | 0.1 | 5 |
| 34 | 1.0 | 100 |
|   | 0.1 | 100 |
| 35 | 1.0 | 100 |
|   | 0.1 | 0 |
| 36 | 1.0 | 50 |
|   | 0.1 | 0 |
| 37 | 1.0 | 100 |
|   | 0.1 | 5 |
| 38 | 1.0 | 100 |
|   | 0.1 | 50 |
| 39 | 1.0 | 100 |
|   | 0.1 | 0 |
| 40 | 1.0 | 100 |
|   | 0.1 | 0 |
| 41 | 1.0 | 100 |
|   | 0.1 | 20 |
| 42 | 1.0 | 95 |
|   | 0.1 | 20 |
| 58 | 1.0 | 100 |
|   | 0.1 | 5 |

TABLE XVIII

Larval cattle tick — Mortality after 48 hours

| Active Ingredient Compound | Concentration of Active Ingredient (% w/v) | % Mortality |
|---|---|---|
| 3 | 1.0 | 100 |
|   | 0.1 | 100 |
| 5 | 1.0 | 100 |
|   | 0.1 | 75 |
| 6 | 1.0 | 100 |
|   | 0.1 | 100 |
| 10 | 1.0 | 100 |
|   | 0.1 | 100 |
| 12 | 1.0 | 100 |
|   | 0.1 | 100 |
| 14 | 1.0 | 100 |
|   | 0.1 | 75 |
| 22 | 1.0 | 100 |
|   | 0.1 | 100 |
| 25 | 1.0 | 100 |
|   | 0.1 | 100 |
| 26 | 1.0 | 100 |
|   | 0.1 | 0 |
| 43 | 1.0 | 100 |
|   | 0.1 | 100 |
| 44 | 1.0 | 100 |
|   | 0.1 | 100 |
| 45 | 1.0 | 100 |
|   | 0.1 | 100 |
| 46 | 1.0 | 90 |
|   | 0.1 | 90 |
| 47 | 1.0 | 100 |
|   | 0.1 | 100 |
| 48 | 1.0 | 100 |
|   | 0.1 | 90 |
| 49 | 1.0 | 100 |
|   | 0.1 | 100 |
| 50 | 1.0 | 100 |
|   | 0.1 | 100 |
| 51 | 1.0 | 90 |
|   | 0.1 | 0 |
| 55 | 1.0 | 100 |
|   | 0.1 | 40 |
| 56 | 1.0 | 100 |
|   | 0.1 | 100 |
| 57 | 1.0 | 100 |
|   | 0.1 | 100 |
| 59 | 1.0 | 100 |
|   | 0.1 | 0 |
| 60 | 1.0 | 100 |
|   | 0.1 | 30 |

Example 81

A dispersible powder was prepared as follows:

| | |
|---|---|
| Compound 14 | 10 parts by weight |
| "Teric" GN 8 | 1 part by weight |
| Clay | 84 parts by weight |
| Water | 5 parts by weight |

"Teric" GN 8 (Registered Trade Mark) is a nonionic surfactant obtained by condensing nonylphenol with about 8½ moles of ethylene oxide. The powder was dispersed in water to give concentrations of active ingredient as described in Examples 78 and 79. When the formulation was applied to tick infested calves as described in Examples 78 and 79, results similar to those of Examples 78 and 79 were obtained.

Example 82

An aqueous sprayable composition containing 0.2 percent w/v of compound 3 was prepared by the general method of Example 74. 200 millilitres of the composition was sprayed in a spray cabinet on to the following group of plants: a pot of 30 5 inches tall wheat plants; a pot of 30 5 inches tall oat plants; and a box of 9 four week old tobacco plants. 24 hours after spraying the plants were infected in the following manner. The wheat plants were inoculated with *Erysiphe graminis*, the oat plants were inoculated with *Puccinia coronota* and the tobacco plants were inoculated with *Peronospora tabacina*, in each case inoculation being effected by dusting the plants with a concentrated spore suspension of the appropriate fungus taken from infected plant material.

After inoculation the wheat was returned to the glass house and the oats and tobacco were placed in a high humidity cabinet for 24 hours and then returned to the glass house. The wheat was assessed for disease 4 days, the oats 8 days, after inoculation. The tobacco plants were returned to the humidity cabinet 6 days after inoculation for a period of 24 hours and then returned to the glass house and assessed on the 7th day. Each set of plants showed only a range of from 0 to 25 percent of disease when compared with a similar set of plants which had been similarly infected but not sprayed.

Example 83

Aqueous sprayable compositions containing 0.2 percent w/v of compounds 49, 52, and 53 were prepared by the general method of Example 74. Two hundred millilitres of each of these compositions was sprayed in a spray cabinet onto a box of 9 four week old tobacco plants. 24 hours after spraying the tobacco plants were inoculated with *Peronospora tabacina*, inoculation being effected by dusting the plants with a concentrated spore suspension taken from infected plant material, as described in Example 82 hereinabove. The plants were then placed in a high humidity cabinet for 24 hours, then allowed to stand in a glasshouse for 4 days, then returned to the high humidity cabinet for a further 24 hours, and assessed for disease the following day. The results obtained are presented in Table XIX below.

TABLE XIX

| Active Ingredient Compound Number | % Inhibition of Spores (rating)* |
|---|---|
| 49 | 3 |
| 52 | 3 |
| 53 | 3 |

*Rating
3 = 90 – 100% inhibition of spores
2 = 60 – 90% inhibition of spores
1 = 30 – 60% inhibition of spores

Example 84

An aqueous sprayable composition containing 0.2 percent w/v of compound 35 was prepared according to the method of Example 74 hereinabove. 200 millilitres of this composition was sprayed in a spray cabinet onto a pot of 30 5 inches tall wheat plants. Twenty four hours after spraying the plants were inoculated with *Erysiphe graminis* by dusting with a concentrated spore suspension taken from infected plant material. The plants were then placed in a glasshouse for 4 days, and then assessed for disease. It was observed that the spores had suffered complete inhibition and that the plants were substantially free of disease.

Example 85

An emulsifiable concentrate consisting of 20 parts of compound 17 as the active ingredient; 5 parts of "Teric" 200; 5 parts of "Alkanate" CS; 0.3 parts of "Teric" N15; and toluene to a total of 100 parts was prepared. "Teric" 200 (Registered Trade Mark of ICI Australia Limited) is a non-ionic surfactant obtained by condensing nonylphenol with ethylene oxide and propylene oxide. "Teric" N15 (Registered Trade Mark of ICI Australia Limited) is a non-ionic surfactant obtained by condensing nonylphenol with 15 moles of ethylene oxide. "Alkanate" CS (Registered Trade Mark of ICI Australia Limited) is an anionic surfactant consisting of a 70 percent solution of calcium dodecylbenzene sulphonate in a non-aqueous solvent. The concentrate so prepared was emulsified in water to give a weight per volume concentration of active ingredient of 25 p.p.m.

The emulsion so prepared was sprayed on to areas on the back of sheep carrying 2 inches of wool until the area was drip wet. The sheep were allowed to run under natural conditions in paddocks and four weeks after the spray was applied, larvae of a "resistant" strain of sheep blowfly (*Lucilia cuprina*) were applied to the treated areas by a method known as the larvae implant test which involves the scarifying of the skin of the treated area, applying a number of larvae and sewing these under the wool under a moistened cotton wool plug so as to simulate a natural blowfly strike.

In these tests the mortality of the blowfly larvae was 100 percent and the phenomenon of blowfly strike did not develop on the treated area. Identical tests conducted on untreated sheep resulted in the survival of the larvae and the development of experimental blowfly strike.

Example 86

Emulsions of compounds 9, 24 and 51, were prepared by the method of Example 74 and were diluted with water and mixed with molten agar to give weight per volume concentrations of compounds 9, 24 and 54 of 2, 10 and 25 ppm in the final product. The prepared agar mixtures were poured over microscopic slides. When the mixture had solidified on each slide, the slide was inoculated under a settling tower with spores of *Tilletia foetida* (stinking bunt of wheat). A slide containing no active ingredient was prepared in a similar manner. After incubation of the inoculated slides at 25°C. for 24 hours the percentage inhibition of spores was observed. The control obtained is shown in Table XX below.

TABLE XX

| Active Ingredient Compound | Concentration of active ingredient — p.p.m. | % Inhibition of spores (rating)* |
|---|---|---|
| Nil | 0 | 0 |
| 9 | 2 | 2 |
| 9 | 10 | 3 |
| 9 | 25 | 3 |
| 24 | 2 | — |
| 24 | 10 | 3 |
| 24 | 25 | 3 |
| 51 | 2 | — |
| 51 | 10 | — |
| 51 | 25 | 3 |

*Rating as for Example 83 hereinabove.

Example 87

Aqueous suspensions of compounds 16, 50 and 54 were prepared according to the method of Example 74, and containing 25 ppm of active ingredient compound. Then 0.25 millilitres of each of these suspensions was placed in a small glass container, and a small quantity of an aqueous *Sclerotinia fructicola* (brown rot) spore suspension containing a small amount of agar, was added thereto. The glass containers were well shaken, and the mixtures allowed to set and then incubated at 25°C for 24 hours, when the percentage inhibition of spores was observed. For comparison purposes a small quantity of the aqueous spore suspension described hereinabove, and containing no active ingredient compound, was also incubated. The results obtained are shown in Table XXI below.

TABLE XXI

| Active Ingredient Compound | % Inhibition of Spores (rating)* |
|---|---|
| Nil | 0 |
| 16 | 3 |
| 50 | 2 |
| 54 | 3 |

*Rating as for Example 83 hereinabove.

We claim:
1. A process for eradicating acarina from plants or animals infested with acarina which comprises applying to such plants or animals an acaricidally effective amount of a compound of the formula

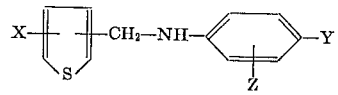

wherein:
X is selected from the group consisting of hydrogen, chlorine, methyl and bromine,
Y is selected from the group consisting of hydrogen, chlorine, fluorine and methyl, and
Z is selected from the group consisting of hydrogen, chlorine and methyl 2. The process of claim 1 wherein the acarina are *Boophilus microplus*.

3. The process of claim 1 wherein the compound has the formula

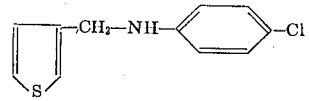

4. The process of claim 1 wherein the compound has the formula

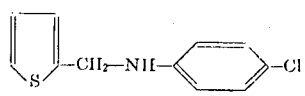

5. The process of claim 1 wherein the compound has the formula
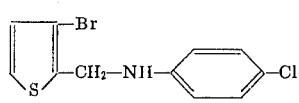
6. The process of claim 1 wherein the compound has the formula
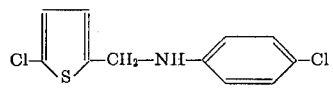
* * * * *